W. W. WOOSTER.
BALL THROWER.
APPLICATION FILED NOV. 5, 1915.
1,175,035.
Patented Mar. 14, 1916.
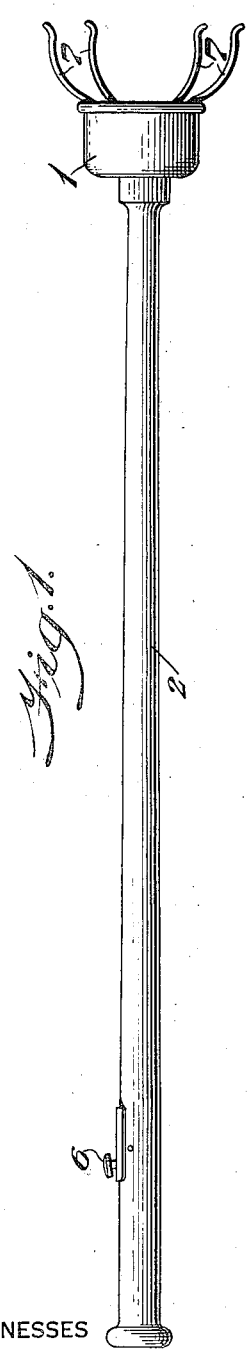
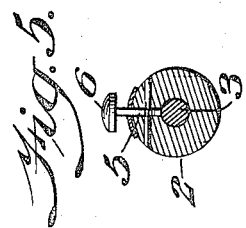
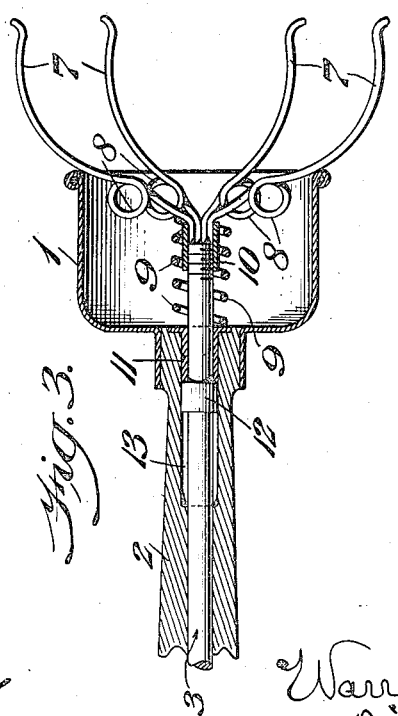
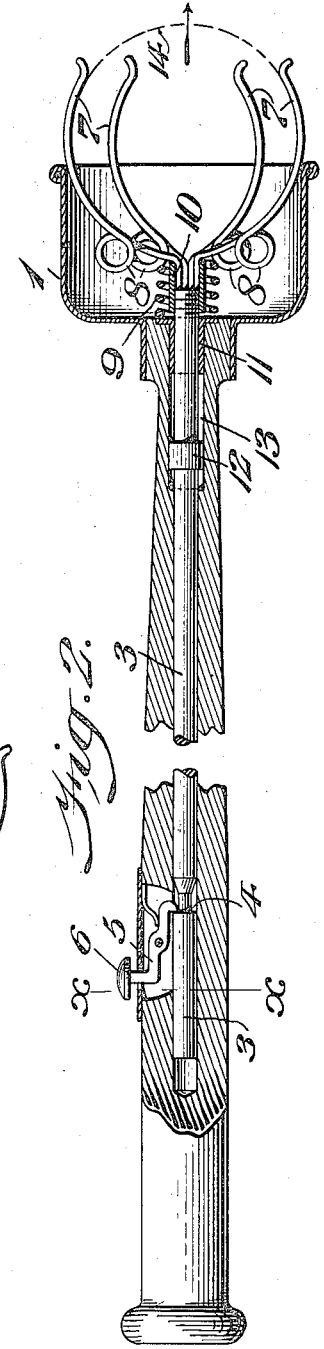
WITNESSES
INVENTOR
BY
ATTORNEYS

UNITED STATES PATENT OFFICE.

WARREN W. WOOSTER, OF BERLIN, NEW JERSEY.

BALL-THROWER.

1,175,035.

Specification of Letters Patent.   Patented Mar. 14, 1916.

Application filed November 5, 1915.   Serial No. 59,749.

*To all whom it may concern:*

Be it known that I, WARREN W. WOOSTER, a citizen of the United States, residing at Berlin, in the county of Camden, State of New Jersey, have invented a new and useful Ball-Thrower, of which the following is a specification.

My invention consists of a ball thrower composed of resilient arms which are adapted to receive a ball, a cup which is adapted to close said arms on the ball and hold the latter, a plunger or stem which is connected with said arms and adapted to be engaged by a trigger or dog for primarily controlling said plunger, and a resilient member for impelling said arms as a catapult when said plunger is released, so that as the arms expand said ball is shot forward therefrom and leaves the arms by inertia, whereby it may be impelled to a considerable extent, assisted by flinging the device by hand.

The invention is satisfactorily illustrated in the accompanying drawing, but the important instrumentalities thereof may be varied, as long as they are included in the scope of the claims.

Figure 1 represents a side elevation of a ball-thrower embodying my invention. Fig. 2 represents a partial side elevation and a partial longitudinal section thereof on an enlarged scale. Fig. 3 represents a longitudinal section of a portion shown in Fig. 2, certain portions of the device being in different positions from those shown in say Fig. 2. Fig. 4 represents a front view of the device as shown in Fig. 2. Fig. 5 represents a transverse section on the line *x—x* Fig. 2.

Similar numerals of reference indicate corresponding parts in the figures.

Referring to the drawings, 1 designates a cup or cup-shaped body with the back of which is connected the tubular or hollow handle 2.

3 designates a sliding rod or stem which is passed freely through said handle and has on the same near the end thereof opposite to said cup, the shoulder 4 which is adapted to be engaged by the nose of the spring pressed trigger 5, which movably occupies a slot in said handle, pivotally connected with the latter and has its head 6 on the exterior of the latter so as to be engaged readily by the thumb or hand of the operator to press the trigger to release the shoulder 4 therefrom.

Connected with the forward end of the plunger are the resilient arms 7 which flare outwardly from said plunger and are partly within the cup 1, and partly are outside of the same in spread condition, so that they are adapted to engage the front end of said cup, as most plainly shown in Fig. 3, said arms having in their lengths the coils 8 which are adapted to increase the resiliency thereof.

Interposed between the base of the arms 7 and that of the cup 1 is the spring 9 whose object is to advance said arms forcibly from the position shown in Fig. 2 to that shown in Fig. 3. In order to limit the inward motion of the arms and consequently of the stem 3, the forward end of the latter has secured to it the sleeve 10 which is adapted to have the inner terminals of said arm secured thereto, said sleeve being adapted to abut the thimble 11 which is fitted in the bore of the handle 2 at the forward end of the handle and serves as a stop for said sleeve 10 while also guiding the adjacent portion of the stem which is slidable in said thimble.

In order to limit the forward motion of the stem and consequently of the arm 7 there is secured to said stem the collar 12 which when the stem is let-go is adapted to abut the adjacent end of the thimble as a stop, the effect of which is evident. The portion 13 of the bore of the handle which receives the thimble 11 and stop 12 is increased in diameter, so as to accommodate said members. The arms form somewhat of a cage to receive the ball 14 to be thrown as shown in dotted lines in Fig. 2.

When the arms are in position, shown in Fig. 3, the ball is placed within the same. Then the arms 3 are pushed into the cup, the rod sliding in the handle in advance of said arms, when the trigger engages the rod 3 at the shoulder 4, and so controls said rod, the spring 9 being compressed. As the arms enter the cup portions of the same they ride on the outer edge of the latter and so are contracted and caused to close on the ball, see Fig. 2, and take firm hold thereof. Then the trigger is operated whereby the rod is released and owing to the action of the spring 9 now permitted to expand, said stem is forcibly impelled toward the cup end of the device, advancing with it the arms 7, the portions of which passing the outer edge of the cup are allowed to expand outside of the cup, thus releasing their hold on the ball when the latter by inertia is shot powerfully out of the cage forwardly to the desired place to which the device is thrown out.

It will be seen that I have produced a simply-constructed, inexpensive and easily-operated device of the order of an amusement, and one in which the device may be thrown by the hand after the manner of a golf stick in a required direction, the trigger also being operated whereby the arms are sufficiently released of the holding action of the cup due to the expansion of the spring 9 when the ball is sufficiently loose in the arms to fly out therefrom assisted by the throw or fling that may be given to the device.

Having thus described my invention what I claim as new and desire to secure by Letters Patent, is:—

1. A ball thrower composed of an expansible slidable ball holder, a cup into which said holder may be moved and by whose reduced diameter the members of said holder are adapted to be compressed, a slidable stem adapted to carry said holder, a tubular handle adapted to carry said cup, said stem being fitted freely in said handle, a resilient device adapted to relieve said holder of compression in said cup, and a trigger-like member on said handle adapted to engage said stem to control said holder in its operative position prior to being discharged.

2. A cup, a movable ball holder partly occupying said cup and movable therein, a tubular handle to which said cup is secured, a movable rod in said handle, said holder being connectible with said rod, a trigger-like member adapted to engage said rod, a thimble member in the forward end of said handle, and a tubular stop member on the rear end of said ball holder, the last named stop being adapted to abut the first named stop on the return motion of said ball holder.

3. A cup, a movable ball holder partly occupying said cup and movable therein, a tubular handle to which said cup is secured, a movable rod in said handle, said holder being connectible with said rod, a trigger-like member adapted to engage said rod, a thimble member in the forward end of said handle, a tubular stop member on the rear end of said ball holder, the last named stop being adapted to abut the first named stop on the return motion of said ball holder, and a member on said rod which is adapted to abut said thimble member on the discharged position of said ball holder.

WARREN W. WOOSTER.

Witnesses:
 JOHN A. WIEDERSHEIM,
 N. BUSSINGER.